United States Patent
Jensen et al.

(10) Patent No.: US 10,493,405 B1
(45) Date of Patent: Dec. 3, 2019

(54) OZONE CONVERTER LEADING EDGE PROTECTION

(71) Applicant: HONEYWELL INTERNATIONAL INC., Morris Plains, NJ (US)

(72) Inventors: Joseph Jensen, Torrance, CA (US); Edgar Rene Crosswell Ochoa, Mexicali (MX); Yung Oey, Torrance, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/992,508

(22) Filed: May 30, 2018

(51) Int. Cl.
*B01D 53/88* (2006.01)
*B01D 53/86* (2006.01)
*B64D 13/06* (2006.01)

(52) U.S. Cl.
CPC ....... *B01D 53/885* (2013.01); *B01D 53/8675* (2013.01); *B01D 2257/106* (2013.01); *B64D 13/06* (2013.01); *B64D 2013/0685* (2013.01)

(58) Field of Classification Search
None
See application file for complete search history.

(56) References Cited

U.S. PATENT DOCUMENTS

| 4,348,360 A * | 9/1982 | Chang ................ B01J 35/04 422/122 |
| 6,577,828 B1 | 6/2003 | Ramos |
| 6,863,984 B2 | 3/2005 | Engelhard |

FOREIGN PATENT DOCUMENTS

| CN | 106512715 A | 3/2017 |
| EP | 0653956 B1 | 4/1996 |
| EP | 3228846 A1 | 10/2017 |
| FR | 3011819 A1 | 4/2015 |
| WO | 9403265 A1 | 2/1994 |
| WO | 9806480 A1 | 2/1998 |

OTHER PUBLICATIONS

EP search and opinion, application No. 19177147.6, dated Sep. 25, 2019.

* cited by examiner

*Primary Examiner* — Walter D. Griffin
*Assistant Examiner* — Jelitza M Perez
(74) *Attorney, Agent, or Firm* — Shimokaji IP

(57) ABSTRACT

A core to receive an air flow having foreign object debris (FOD) has an inlet plane at which the air flow can enter the core, a fin element having a fin configuration, and a first protective component. The first protective component is constructed of a material and has a first protective configuration sufficient to repel FOD.

12 Claims, 4 Drawing Sheets

US 10,493,405 B1

OZONE CONVERTER LEADING EDGE PROTECTION

BACKGROUND OF THE INVENTION

The present invention generally relates to ozone converters and, more particularly, to apparatus and methods of preventing damage to the same from foreign object debris.

For environmental control system (ECS) ozone converters, there can be incoming foreign object debris (FOD) that can damage the ozone converter. Some ECS converter cores are constructed of aluminum for low weight and reduced cost and since the ozone converters are installed in front of the ECS system or immediately downstream of the pre-cooler, the ozone converter can be damaged on the leading edge of the ozone converter. This has been seen on recently returned commercial converters, especially those flying in areas with potential high low altitude FOD such as the Mid-East.

As can be seen, there is a need for improved apparatus and methods for minimizing FOD damage to ozone converters and the like.

SUMMARY OF THE INVENTION

In one aspect of the present invention, a core to receive an air flow having foreign object debris (FOD) comprises an inlet plane at which the air flow can enter the core; a fin element having a fin configuration; a first protective component; wherein the first protective component is constructed of a material and has a first protective configuration (material and geometry) sufficient to repel FOD.

In a further aspect of the present invention, a core to receive an air flow having foreign object debris (FOD) comprises a fin element; and a first protective component constructed and configured to prevent FOD from reaching the fin element, while maintaining any additional pressure drop, if any, between the first protective component and the fin element at not more than 3%.

In another aspect of the present invention, an ozone converter that can receive an air flow having foreign object debris (FOD) comprises a housing; an outlet to the housing and that configured to feed a discharge to an environmental control system; and a core in the housing, wherein the core includes: an inlet plane at which the air flow can enter the core; a fin element; a first protective component upstream of the fin element; a second protective component upstream of the first protective component; wherein the first and second protective components are constructed and configured to: prevent FOD from impacting the fin element; and limit any additional pressure drop from the inlet plane to the fin element to not more than 3%.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides a finned core, such as one that may be used for an ozone converter. The ozone converter may feed discharge air to an environmental control system (ECS). The ECS may be employed in a vehicle such as an aircraft.

The finned core can have one and optionally two protective components that are constructed of a material and have a configuration that can prevent fin damage by foreign object debris (FOD), as compared to fine particles. Though not an exclusive mechanism, one or both of the protective components provide protection to the fins core by repelling FOD, as opposed to capturing and holding FOD. Thereby, FOD can be prevented from entering the main finned portion of the core.

Herein, "FOD" means objects having a diameter between about 0.10 to about 0.50 inches, a weight between about 0.0004 to about 0.006 pounds, and a speed between about 50 to about 200 feet per second.

Figure 1:
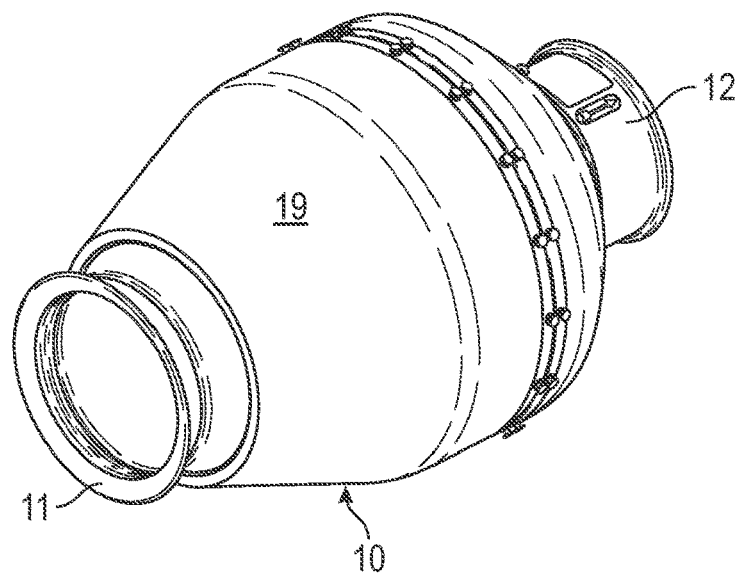
FIG. 1 is a perspective view of an ozone converter according to an embodiment of the present invention.

FIG. 1 depicts an exemplary embodiment of an ozone converter 10. The converter 10 may have a housing 19, an inlet 11, and an outlet 12. A finned core (not shown) may be disposed in the housing 19, in between the inlet 11 and the outlet 12.

Figure 2:
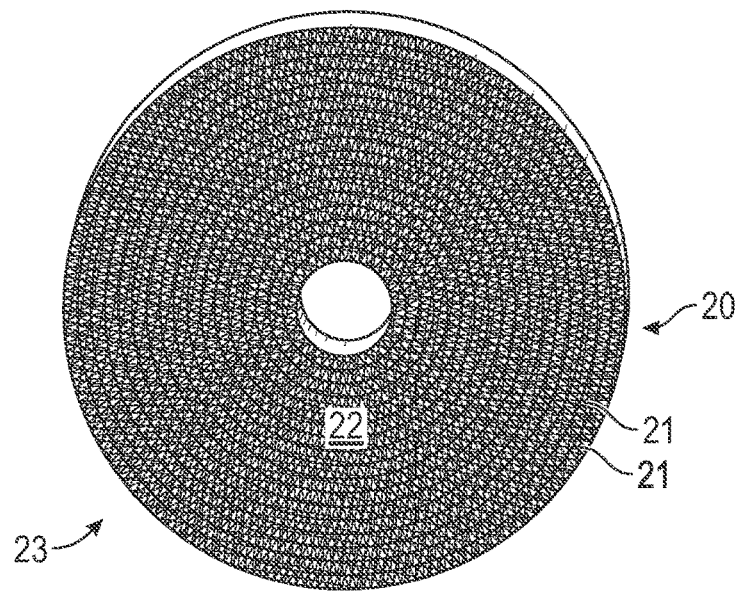
FIG. 2 is a perspective view of a core of an ozone converter according to an embodiment of the present invention.

FIG. 2 depicts an exemplary embodiment of a core 20 that may be employed in an ozone converter, as an example. In the context of an ozone converter, the core 20 may have portions thereof coated with a catalyst for ozone conversion and potentially for conversion of other substances.

The core 20 may have an inlet face 22 configured to be positioned at the inlet 11 of the ozone converter 10. Thereby, the inlet plane or face 22 can receive an air flow 23 that may contain FOD.

The core 20 may have fin layers 21. Each fin layer 21 may have a circular, annular configuration. The fin layers 21 may each have a different circumference so that they may be radially adjacent to one another at different radii from the core center. One or more of the fin layers 21 may have a fin element described below.

Figure 3:
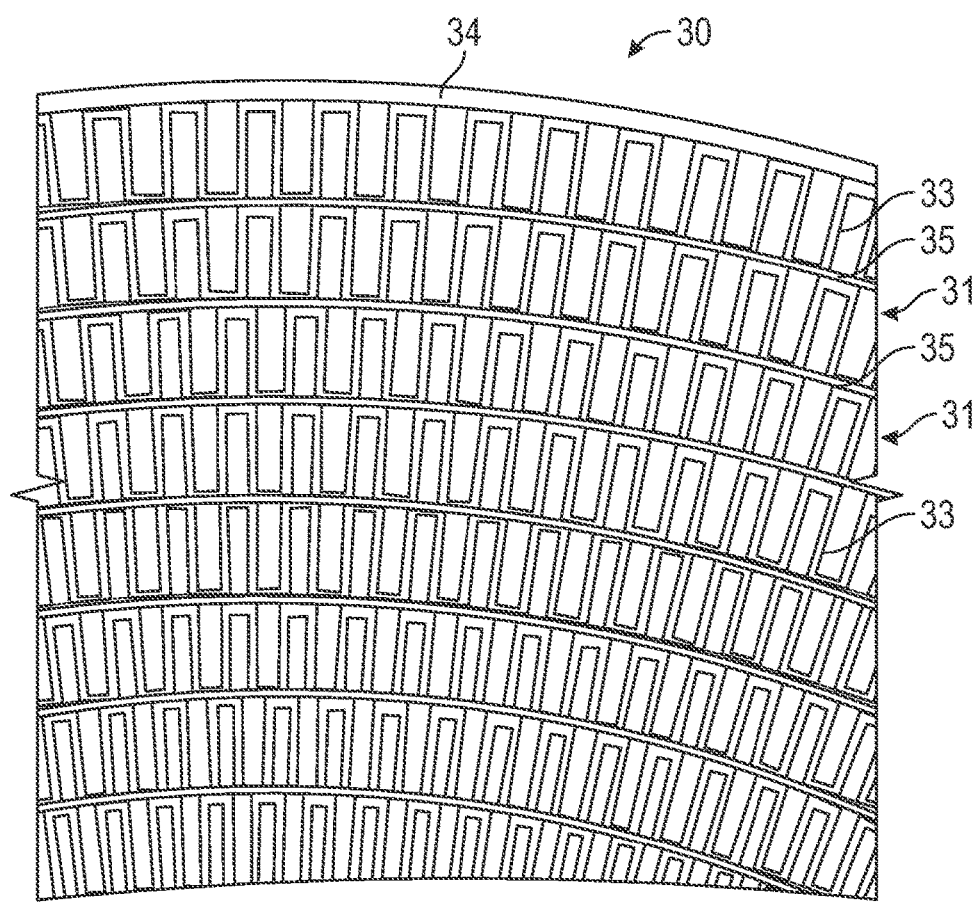
FIG. 3 is a schematic partial front view of fins of a core of an ozone converter according to an embodiment of the present invention.

In FIG. 3, an exemplary core 30 may be similar to that described in relation to FIG. 2. Accordingly, reference numbers in FIG. 3 correspond to like reference numbers in FIG. 2.

The core 30 can have a cover element 34 and a plurality of fin layers 31 separated by separator elements 35. One or more of the fin layers 31 may have a fin element 33. A fin element 33 may be constructed of a material such as aluminum or other structural material, which may be susceptible to damage upon high velocity impact with FOD.

One or more of the fin elements 33 may have a fin configuration, such as a serpentine configuration, or an alternating rectangular cross-section. However, other configurations are contemplated and not all fin elements 33 need have the same configuration. In embodiments, one or more of the fin elements 33 may be coated with a catalyst, such as an ozone converter catalyst.

Figure 4:
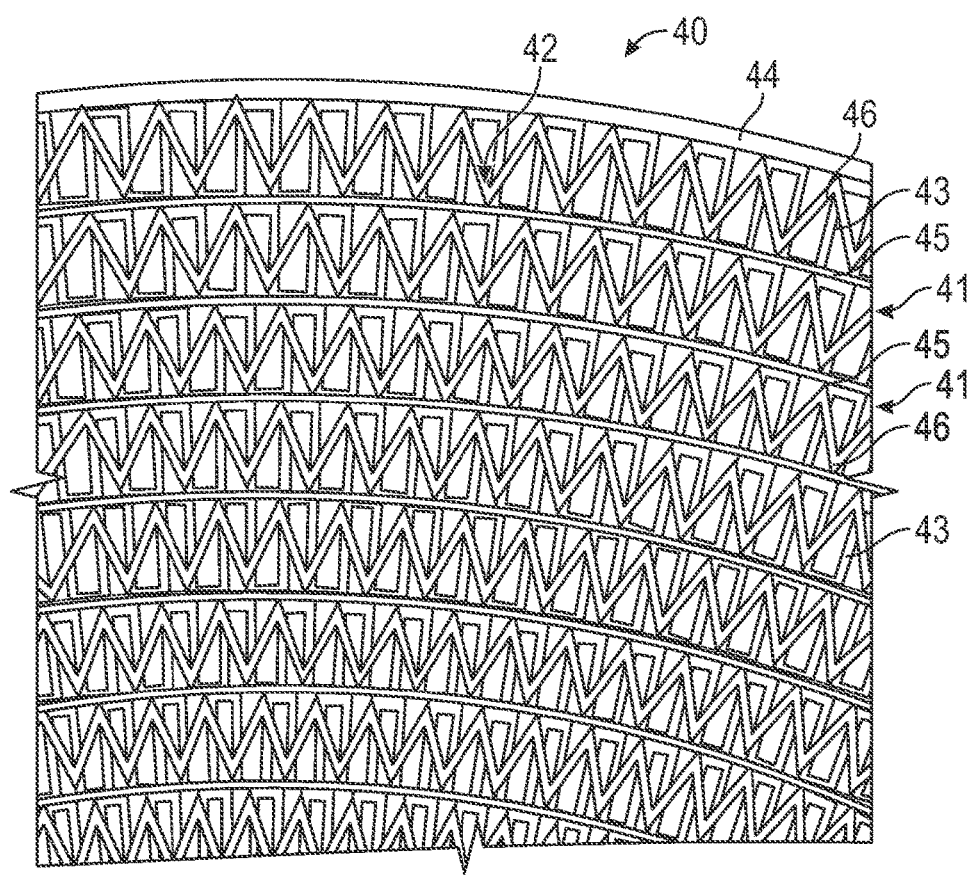
FIG. 4 is a schematic partial front view of a first protective component of a core of an ozone converter according to an embodiment of the present invention.

In FIG. 4, an exemplary core 40 may be similar to that described in relation to FIGS. 2-3. Accordingly, reference numbers in FIG. 4 correspond to like reference numbers in FIGS. 2-3.

The core 40 may include an outer housing element 44 and a plurality of fin layers 41 separated by a separator element 45. One or more of the fin layers 41 may have a fin element 43. The core 40 may further include a plurality of first protective components 46 configured in a plurality of radially extending first protective layers. One or more of the first protective components 46 may be disposed upstream of one or more of the fin elements 43. In other words, one or more of the first protective components 46 may be closer to an inlet plane 42 of the core 40. The first protective component 46 may be constructed of a material such as thicker gauge aluminum.

In embodiments, one or more of the first protective components 46 may have a first protective configuration. In embodiments, some or all of the first protective components 46 may have the same or different configurations. In other embodiments, the first protective configuration may be the same or different from the fin configuration. In various embodiments, the first protective configuration is zig-zag or triangular fin. This first protective element 46 is often thicker than the main body fin 43, thus having a more impact resistant eliminate at the core face while reducing the weight increase.

According to embodiments, the first protective component 46 may be configured to enable an air flow into the core 40, and in particular into the fin elements 43, without a significant reduction in air pressure. Thus, in certain embodiments, a pressure drop, if any, of the air flow from the first protective component 46 to the fin elements 43 may be no more than about 0% to about 3%. In other embodiments, the first protective component 46 may have a porosity of at least about 75% and up to about 95%.

Figure 5:
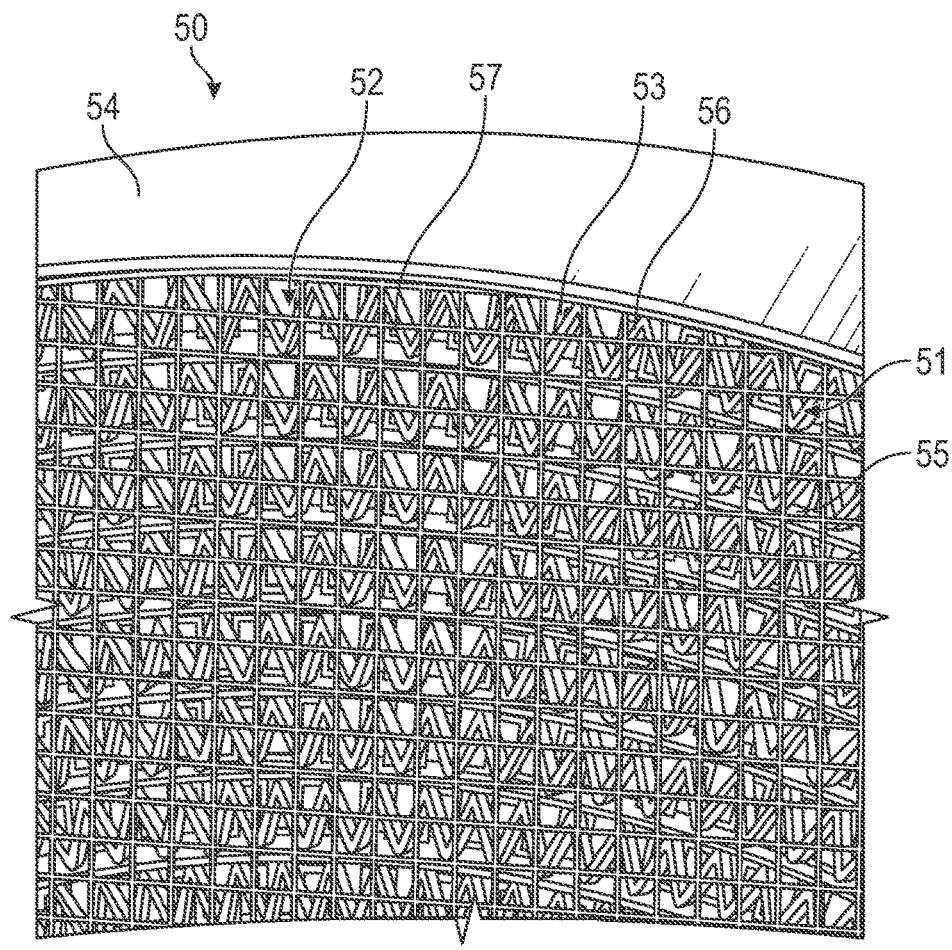
FIG. 5 is a partial perspective view of first and second protective components of a core of an ozone converter according to an embodiment of the present invention.

In FIG. 5, an exemplary core 50 may be similar to that described in relation to FIGS. 2-4. Accordingly, reference numbers in FIG. 5 correspond to like reference numbers in FIGS. 2-4.

The core 50 may be constructed like the core 40 in FIG. 4 and may further include a second protective component 57 having a plurality of second protective component layers. The second protective component 57 may be disposed upstream of the first protective components 56 and the fin elements 53. In other words, the second protective component 57 may be closer to an inlet plane 52 of the core 50 in comparison to the first protective components 56. In embodiments, the second protective component 57 is on the inlet plane 52. In other embodiments, the second protective component 57 is affixed to a leading edge of the cover element 54 and/or to one or more of the separator elements 55. Accordingly, the separator elements 55 extend, in an upstream direction, only to but not in or through the second protective component layers. Attachment may also be done by rigidly inserting into unit cavity as the rigid support cannot be made to flow though the ozone converter.

The second protective component 57 may be constructed of a material such as aluminum or steel. The second protective component 57 may be coated with a catalyst, such an ozone conversion catalyst though the amount of surface area is limited. Likewise, the first protective components 56 and/or the fin elements 53 may be coated with the same or different catalyst.

In embodiments, the second protective component 57 may have a second protective configuration. In embodiments, the second protective configuration may be the same or different from first protective configuration(s) and/or the same or different from the fin configuration(s). In various embodiments, the second protective configuration is crisscross or of a triangular shape.

According to embodiments, the second protective component 57 may be configured to enable an air flow into the core 50, and in particular into the fin elements 53, without a significant reduction in air pressure. Thus, in certain embodiments, a pressure drop, if any, of the air flow from the second protective component 57 to the fin elements 53 may be no more than about 0% to about 3%. In other embodiments, the second protective component 57 may have a porosity of at least about 75% and up to about 95%.

In further embodiments, the combination of the first and second protective components 56, 57 may be configured to enable an air flow into the core 50, and in particular into the fin elements 53, without a significant reduction in air pressure. Thus, in certain embodiments, a pressure drop, if any, of the air flow from the second protective component 57, through the first protective components 56, and to the fin elements 53 may be no more than about 0 to about 4%. In other embodiments, the combined first and second protective components 56 and 57 may have a combined porosity of at least about 60% and up to about 90%.

Thus, the first protective component 56 or the second protective component 57, or the combination of the first and second protective components 56, 57 may be constructed of a material and be of a configuration sufficient to repel FOD (as defined above) and prevent damage to the fin elements 53. The act of repelling may occur in the absence of the first protective component 56 or the second protective component 57, or the combination of the first and second protective components 56, 57 retaining FOD therein.

It should be understood, of course, that the foregoing relates to exemplary embodiments of the invention and that modifications may be made without departing from the spirit and scope of the invention as set forth in the following claims.

We claim:

1. A core to receive an air flow having foreign object debris (FOD), comprising:
    an inlet plane at which the air flow can enter the core;
    a cover element;
    a plurality of fin layers that extend longitudinally along the core;
    wherein the plurality of fin layers are circular in configuration and radially extend outward from a center of the core to the cover element;
    wherein each of the plurality of fin layers has a respective fin element;
    wherein each of the respective fin elements has a respective fin element configuration;
    wherein the fin elements are constructed of a material susceptible to damage from FOD;

a plurality of separator elements, wherein a respective separator element is between adjacent fin layers;
a plurality of first protective component layers that extend longitudinally along the core;
wherein the plurality of first protective component layers are upstream of the plurality of fin layers;
wherein the plurality of first protective component layers are circular in configuration and radially extend outward from a center of the core to the cover element;
wherein each of the plurality of first protective component layers is aligned, longitudinally, with a respective fin layer;
wherein each of the plurality of first protective component layers has a respective first protective component;
wherein each of the respective first protective components has a respective first protective component configuration;
wherein a respective separator element is between adjacent first protective component layers;
wherein the first protective component is constructed of a material sufficient to repel the FOD.

2. The core of claim 1, further comprising:
a plurality of second protective component layers constructed of a material and has a second protective component configuration sufficient to repel FOD;
wherein the second protective component layers are closer to the inlet plane in comparison to the first protective component layers.

3. The core of claim 1, wherein the fin element configuration is different from the first protective component configuration.

4. The core of claim 1, wherein the first protective component configuration has a porosity, in terms of FOD, of at least 75%.

5. The core of claim 1, wherein a pressure drop, in a downstream direction, between the first protective component layers and the fin layers is not more than 3%.

6. The core of claim 1, wherein:
the fin element configuration is serpentine or rectangular; and
the first protective component configuration is zig-zag or triangular.

7. The core of claim 1, wherein:
the fin element configuration is serpentine; and
the first protective component configuration is a zig-zag.

8. An ozone converter that can receive an air flow having foreign object debris (FOD), wherein FOD are objects having a diameter between 0.10 to 0.50 inches, a weight between 0.0004 to 0.006 pounds, and a speed between 50 to 200 feet per second, the converter comprising:
a housing;
an outlet to the housing and that is configured to feed a discharge to an environmental control system; and
a core in the housing, wherein the core includes:
an inlet plane at which the air flow can enter the core;
a cover element;
a plurality of fin layers that extend longitudinally along the core;
wherein the plurality of fin layers are circular in configuration and radially extend outward from a center of the core to the cover element;
wherein each of the plurality of fin layers has a respective fin element;
wherein each of the respective fin elements has a respective fin element configuration;
wherein the fin elements are constructed of a material susceptible to damage from FOD;
a plurality of separator elements, wherein a respective separator element is between adjacent fin layers;
a plurality of first protective component layers that extend longitudinally along the core;
wherein the plurality of first protective component layers are upstream of the plurality of fin layers;
wherein the plurality of first protective component layers are circular in configuration and radially extend outward from a center of the core to the cover element;
wherein each of the plurality of first protective component layers is aligned, longitudinally, with a respective fin layer;
wherein each of the plurality of first protective component layers has a respective first protective component;
wherein each of the respective first protective components has a respective first protective component configuration;
wherein a respective separator element is between adjacent first protective component layers;
a plurality of second protective component layers at and which completely cover the inlet plane of the core;
wherein the plurality of second protective component layers are upstream of the plurality of first protective component layers;
wherein the plurality of second protective component layers are circular in configuration and radially extend outward from a center of the core to the cover element;
wherein each of the plurality of second protective component layers is mis-aligned, longitudinally, with a respective first protective component layer;
wherein each of the plurality of second protective component layers has a respective second protective component;
wherein each of the respective second protective components has a respective second protective component configuration;
wherein the separator elements extend, in an upstream direction, only to the second protective component layers.

9. The converter of claim 8, wherein a combined porosity, in terms of FOD, of the first and second protective component layers is at least 70%.

10. The converter of claim 8, wherein:
the fin element configuration is serpentine;
the first protective component configuration is zig-zag; and
the second protective component configuration is criss-cross.

11. The converter of claim 8, wherein at least one of the fin elements, the first protective components, and the second protective components is coated with a catalyst.

12. The converter of claim 8, wherein the second protective component layers are removable from the core.

* * * * *